(12) United States Patent
Byron et al.

(10) Patent No.: US 9,916,378 B2
(45) Date of Patent: Mar. 13, 2018

(54) SELECTING A STRUCTURE TO REPRESENT TABULAR INFORMATION

(71) Applicant: International Business Machines Corporation, Armonk, NY (US)

(72) Inventors: Donna Karen Byron, Petersham, MA (US); Scott N. Gerard, Wake Forest, NC (US); Alexander Pikovsky, Laxington, MA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 406 days.

(21) Appl. No.: 14/332,483

(22) Filed: Jul. 16, 2014

(65) Prior Publication Data

US 2015/0169720 A1 Jun. 18, 2015

Related U.S. Application Data

(63) Continuation of application No. 14/109,366, filed on Dec. 17, 2013.

(51) Int. Cl.
*G06F 17/30* (2006.01)
*G06F 17/22* (2006.01)
*G06F 17/24* (2006.01)

(52) U.S. Cl.
CPC .... *G06F 17/30654* (2013.01); *G06F 17/2211* (2013.01); *G06F 17/245* (2013.01); *G06F 17/30864* (2013.01)

(58) Field of Classification Search
CPC ............... G06F 17/30864; G06F 3/005; G06F 17/2775; G06F 17/30274
See application file for complete search history.

(56) References Cited

U.S. PATENT DOCUMENTS

| | | | |
|---|---|---|---|
| 8,712,944 B1* | 4/2014 | Kim | G06N 7/00 706/45 |
| 2009/0313205 A1* | 12/2009 | Hino | G06F 17/2247 706/54 |
| 2013/0103615 A1* | 4/2013 | Mun | G06Q 40/06 705/36 R |
| 2013/0297545 A1* | 11/2013 | Bierner | G06Q 50/00 706/46 |
| 2014/0188928 A1* | 7/2014 | Singh | G06F 17/30289 707/769 |

(Continued)

*Primary Examiner* — Mariela Reyes
*Assistant Examiner* — Courtney Harmon
(74) *Attorney, Agent, or Firm* — Garg Law Firm, PLLC; Rakesh Garg; Reza Sarbakhsh

(57) ABSTRACT

A table structure corresponding to the table is selected to describe when cells in a cell-pair in the table structure should be similar to one another. A cell similarity function is selected to compare the cells in the cell-pair and output a probability that the cell-pair includes cells that contain values that are similar to one another according to a criteria. A cell similarity probability is determined of a first cell and a second cell in a first cell-pair in the table structure being similar to each other according to the cell similarity function. A computed probability is adjusted of the table structure representing the table using the cell similarity probability. The computed probability is indicated as a probability of a first model representing the table, wherein the first model is a function of the table structure and the selected cell similarity function.

13 Claims, 7 Drawing Sheets

| | 602<br>TABLE $_{(T1)}$ | 604<br>TABLE $_{(T2)}$ | ... | 606<br>TABLE $_{(Tn)}$ |
|---|---|---|---|---|
| MODEL $M_1 = (T_{1,0,1,0,1,1}, S_{DT})$ | 82% | 31% | | 27% |
| MODEL $M_2 = (T_{1,0,1,1,1,1}, S_{DT})$ | 73% | 79% | | 35% |
| ⋮ | ⋮ | ⋮ | | ⋮ |
| MODEL $M_x$ | 37% | 18% | | 97% |
| SELECTED MODEL | $M_1$ | $M_2$ | | $M_x$ |

600

(56) References Cited

U.S. PATENT DOCUMENTS

| | | | | |
|---|---|---|---|---|
| 2014/0316768 A1* | 10/2014 | Khandekar | ....... | G06F 17/30654 704/9 |
| 2015/0046151 A1* | 2/2015 | Lane | ................... | G06F 17/2785 704/9 |
| 2015/0058337 A1* | 2/2015 | Gordon | ............. | G06F 17/30292 707/736 |

* cited by examiner

*FIG. 3*

| YEAR 310 | GDP (BILLION) 312 | POPULATION (MILLION) |
|---|---|---|
| 2000 | 9951.5 | 282.172 |
| 2001 | 10286.2 | 285.082 |
| 2002 | 10642.3 | 287.804 |
| 2003 | 11142.2 | 290.326 |
| 2004 | 11853.3 | 293.046 |
| 2005 | 12623.0 | 295.507 |
| 2006 | 13377.2 | 298.109 |
| 2007 | 14028.7 | 300.733 |
| 2008 | 14369.1 | 303.380 |
| 2009 | 13939.0 | 306.051 |
| 2010 | 14526.5 | 308.746 |
| AVERAGE 320 | 12430.8 | 295.541 |

502 $P(\mathcal{M}|\mathcal{D}) = \alpha P(\mathcal{D}|\mathcal{M})P_0(\mathcal{M})$ 504 $P(\mathcal{M}|\mathcal{D}) = Beta(\mu_0|a_0, b_0) \prod_r \prod_c \prod_{r'} \prod_{c'} Bern(\mathcal{D}(r, c, r', c')|\mu_0)$

*FIG. 6*

| | 602<br>TABLE (T1) | 604<br>TABLE (T2) | ... | 606<br>TABLE (Tn) |
|---|---|---|---|---|
| MODEL $M_1 = (T_{1,0,1,0,1,1}, S_{DT})$ | 82% | 31% | | 27% |
| MODEL $M_2 = (T_{1,0,1,1,1,1}, S_{DT})$ | 73% | 79% | | 35% |
| . . . | . . . | . . . | | . . . |
| MODEL $M_x$ | 37% | 18% | | 97% |
| SELECTED MODEL | $M_1$ | $M_2$ | | $M_x$ |

SELECTING A STRUCTURE TO REPRESENT TABULAR INFORMATION

The present application is a continuation application of, and claims priority to, a U.S. patent application of the same title, Ser. No. 14/109,366, which was filed on Dec. 17, 2013, assigned to the same assignee, and incorporated herein by reference in its entirety.

BACKGROUND

1. Technical Field

The present invention relates generally to a method for processing of documents. More particularly, the present invention relates to a method for selecting a structure to represent tabular information.

2. Description of the Related Art

Documents include information in many forms. For example, textual information arranged as sentences and paragraphs conveys information in a narrative form.

Some types of information are presented in a tabular organization. For example, a document can include tables for presenting financial information, organizational information, and generally, any data items that are related to one another through some relationship.

Natural language processing (NLP) is a technique that facilitates exchange of information between humans and data processing systems. For example, one branch of NLP pertains to transforming a given content into a human-usable language or form. For example, NLP can accept a document whose content is in a computer-specific language or form, and produce a document whose corresponding content is in a human-readable form.

A question and answer system (Q&A system) is an artificial intelligence application executing on data processing hardware. A Q&A system answers questions pertaining to a given subject-matter domain presented in natural language.

Typically, a Q&A system is provided access to a collection of domain-specific information based on which the Q&A system answers questions pertaining to that domain. For example, a Q&A system accesses a body of knowledge about the domain, where the body of knowledge (knowledgebase) can be organized in a variety of configurations. For example, a knowledgebase of a domain can include structured repository of domain-specific information, such as ontologies, or unstructured data related to the domain, or a collection of natural language documents about the domain. IBM Watson is an example of a Q&A system. (IBM and Watson are trademarks of International Business Machines Corporation in the United States and in other countries).

A Q&A system can be configured to receive inputs from various sources. For example, the Q&A system may receive as input over a network, a corpus of electronic documents or other data, data from a content creator, information from one or more content users, and other such inputs from other possible sources of input. Some or all of the inputs to the Q&A system may be routed through network 102. The various computing devices on the network may include access points for content creators and content users. Some of these computing devices may include devices for storing the corpus of data. The network may include local network connections and remote connections, such that the Q&A system may operate in environments of any size, including local and global, e.g., the Internet. Additionally, the Q&A system can be configured to serve as a front-end system that can make available a variety of knowledge extracted from or represented in documents, network-accessible sources and/or structured data sources. In this manner, some processes populate the Q&A system with input interfaces to receive knowledge requests and respond accordingly.

A content creator creates content in a document for use as part of a corpus of data with the Q&A system. The document may include any file, text, article, or source of data for use in the Q&A system. Content users input questions to the Q&A system that the Q&A system answers using the content in the corpus of data. When a process evaluates a given section of a document for semantic content, the process can use a variety of conventions to query such document from the Q&A system. One convention is to send the query to the Q&A system as a well-formed question. Semantic content is content based on the relation between signifiers, such as words, phrases, signs, and symbols, and what they stand for, their denotation, or connotation. In other words, semantic content is content that interprets an expression, such as by using Natural Language Processing.

The process sends well-formed questions (e.g., natural language questions) to the Q&A system. The Q&A system interprets the question and provides a response to the content user containing one or more answers to the question. The Q&A system can also provide a response to users in a ranked list of answers.

As an example, IBM Watson™ Q&A system receives an input question, parses the question to extract the major features of the question, uses the extracted features to formulate queries, and applies those queries to the corpus of data. Based on the application of the queries to the corpus of data, the Q&A system generates a set of hypotheses or candidate answers to the input question, by looking across the corpus of data for portions of the corpus of data that have some potential for containing a valuable response to the input question.

IBM Watson™ Q&A system then performs deep analysis on the language of the input question and the language used in each of the portions of the corpus of data found during the application of the queries using a variety of reasoning algorithms. There may be hundreds or even thousands of reasoning algorithms applied, each of which performs different analysis, e.g., comparisons, and generates a score. For example, some reasoning algorithms may look at the matching of terms and synonyms within the language of the input question and the found portions of the corpus of data. Other reasoning algorithms may look at temporal or spatial features in the language, while others may evaluate the source of the portion of the corpus of data and evaluate its veracity.

The scores obtained from the various reasoning algorithms indicate the extent to which the potential response is inferred by the input question based on the specific area of focus of that reasoning algorithm. Each resulting score is then weighted against a statistical model. The statistical model captures how well the reasoning algorithm performed at establishing the inference between two similar passages for a particular domain during the training period of the IBM Watson™ Q&A system. The statistical model may then be used to summarize a level of confidence that the IBM Watson™ Q&A system has regarding the evidence that the potential response, i.e. candidate answer, is inferred by the question. This process may be repeated for each of the candidate answers until the IBM Watson™ Q&A system identifies candidate answers that surface as being significantly stronger than others and thus, generates a final answer, or ranked set of answers, for the input question.

More information about the IBM Watson™ Q&A system may be obtained, for example, from the IBM Corporation website, IBM Redbooks, and the like. For example, information about the IBM Watson™ Q&A system can be found in Yuan et al., "Watson and Healthcare," IBM developerWorks, 2011 and "The Era of Cognitive Systems: An Inside Look at IBM Watson and How it Works" by Rob High, IBM Redbooks, 2012.

SUMMARY

The illustrative embodiments provide a method for subject-matter analysis of tabular data. An embodiment includes a method for selecting a structure to represent tabular information. The embodiment selects, corresponding to a table, a table structure from a collection of table structures, a table structure function describing when cells in a cell-pair in the table structure should be similar to one another. The embodiment selects a cell similarity function, wherein the cell similarity function compares the cells in the cell-pair in the table structure and outputs a probability that the cell-pair includes cells that contain values that are similar to one another according to a criteria. The embodiment determines a cell similarity probability of a first cell and a second cell in a first cell-pair in the table structure being similar to each other according to the cell similarity function. The embodiment adjusts a computed probability of the table structure representing the table using the cell similarity probability. The embodiment indicates the computed probability as a probability of a first model representing the table, wherein the first model is a function of the table structure and the selected cell similarity function.

Another embodiment includes a computer usable program product comprising a computer usable storage device including computer usable code for selecting a structure to represent tabular information. The embodiment further includes computer usable code for selecting, corresponding to a table, a table structure from a collection of table structures, a table structure function describing when cells in a cell-pair in the table structure should be similar to one another. The embodiment further includes computer usable code for selecting a cell similarity function, wherein the cell similarity function compares the cells in the cell-pair in the table structure and outputs a probability that the cell-pair includes cells that contain values that are similar to one another according to a criteria. The embodiment further includes computer usable code for determining a cell similarity probability of a first cell and a second cell in a first cell-pair in the table structure being similar to each other according to the cell similarity function. The embodiment further includes computer usable code for adjusting a computed probability of the table structure representing the table using the cell similarity probability. The embodiment further includes computer usable code for indicating the computed probability as a probability of a first model representing the table, wherein the first model is a function of the table structure and the selected cell similarity function.

Another embodiment includes a data processing system for selecting a structure to represent tabular information. The embodiment further includes a storage device including a storage medium, wherein the storage device stores computer usable program code. The embodiment further includes a processor, wherein the processor executes the computer usable program code. The embodiment further includes computer usable code for selecting, corresponding to a table, a table structure from a collection of table structures, a table structure function describing when cells in a cell-pair in the table structure should be similar to one another. The embodiment further includes computer usable code for selecting a cell similarity function, wherein the cell similarity function compares the cells in the cell-pair in the table structure and outputs a threshold probability that the cell-pair includes cells that contain values that are similar to one another according to a criteria. The embodiment further includes computer usable code for determining a cell similarity probability of a first cell and a second cell in a first cell-pair in the table structure being similar to each other according to the cell similarity function. The embodiment further includes computer usable code for adjusting a computed probability of the table structure representing the table using the cell similarity probability. The embodiment further includes computer usable code for indicating the computed probability as a probability of a first model representing the table, wherein the first model is a function of the table structure and the selected cell similarity function.

BRIEF DESCRIPTION OF THE SEVERAL VIEWS OF THE DRAWINGS

The novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

FIG. 3 depicts an example of tabular data within which functional relationships and signatures can be identified in accordance with an illustrative embodiment;

FIG. 6 depicts a manner of determining a best fit between the models considered and the given tabular data in accordance with an illustrative embodiment.

DETAILED DESCRIPTION

Figure 1:
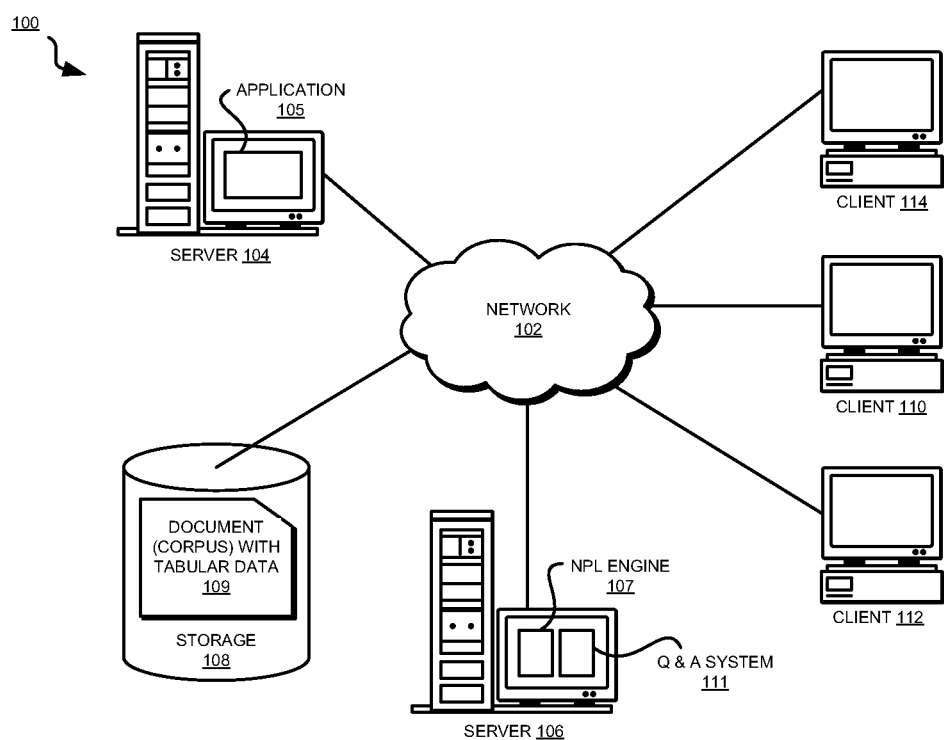
FIG. 1 depicts a pictorial representation of a network of data processing systems in which illustrative embodiments may be implemented.

The illustrative embodiments recognize that documents subjected to NLP commonly include tabular data, to wit, content in the form of one or more tabular data structures (tables). A cell of a table is a containing unit within a table, such that the contents of the cell can be uniquely identified by a row and column or other suitable coordinates of the table.

The illustrative embodiments recognize that information presented within the cells of a table often implicitly relates to information in other cells of the same table, cells of a different table in the same document, or cells or a different table in a different document. The relationships between the information contained in different cells is important for understanding the meaning of the tabular data, and generally for understanding the meaning of the document as a whole.

Many domain-specific documents, especially in financial, medical, and other subject-matter domains (domains), have critical information inside numerous tables. For example, a user might want to know what assets and liabilities were reported on an entity's balance sheet. The information needed to answer such a question is frequently found only inside a table rather than in the narrative text of a financial document.

Recovering information from within tables has been historically a difficult problem. The illustrative embodiments recognize that specialized processing or handling is needed in NLP for interpreting the tabular data correctly and completely. Presently available technology for understanding the relationship between cell-values is limited to heuristically guessing a label for a cell using the row or column titles.

Furthermore, the illustrative embodiments recognize that documents with tabular data can be included in a corpus for a Q&A system. For a Q&A system to be able to answer a question based on the tabular data, the Q&A system has to be able to determine how a given table represents data, the structure and relationships between the cells that are implied in the tabular information, and how a cell provides contextual information to fully comprehend the meaning of data of another cell.

For example, imagine that a balance sheet provides two columns—assets and liabilities. Under the assets and liabilities column, each row presents four cells—one cell under the assets column to describe an asset, another cell adjacent to the asset description to contain the value of that asset, one cell under the liabilities column to describe the nature of a liability, and another cell adjacent to the liability description to contain the value of the liability. Simple row-column interpretation of such tabular data would only comprehend the dollar-values of the assets and liabilities without comprehending the nature of the assets and the liabilities. For example, a simple question such as, "what is the make-up of the asset?" is easy to answer by a human reading the table. However, such a question cannot be answered by simple row-and-column interpretation of a table cell using a machine because the cells adjacent to the value cells provide the context necessary to answer the question and the presently available methods do not have a way to read the adjacent cells as contextual information for another (value-containing) cell.

The illustrative embodiments used to describe the invention generally address and solve the above-described problems and other problems related to the limitations of presently available NLP technology. The illustrative embodiments provide a system, and computer program product for selecting a structure to represent tabular information.

The illustrative embodiments accept tabular data (table) as input, and generate the most probable structure to describe the data in that table as output. The example tables and cells, or their presentation in a particular manner, are only used to describe the operations of the various embodiments with clarity and not as a limitation on the illustrative embodiments. Any manner of representing a table or cells therein, as long as a cell is uniquely identifiable by row and column coordinates in the table, or some other coordinate system used for the table, an embodiment can be configured to determine a structure of that table as described herein.

An embodiment considers several different table structures, evaluates how well each table structure agrees with the input table. In an example evaluation, an embodiment computes a probability that a particular structure does (or does not) represents the data in the table.

The embodiments are described using certain nomenclature—a table structure function T describes when two cells of the table should be similar, e.g., in a table containing rows and columns, when cell (r, c) should be similar to cell (r', c'), r and r' representing row identifiers, and c and c' representing column identifiers. The table structure function is represented as T(r,c,r'c').

A cell similarity function S describes when two individual cells of a table are actually similar to each other. The cell similarity function is represented as S(r,c,r',c').

Data observation D is a combination of T and S. D(r,c, r'c'). An embodiment compares a table structure against a set of data observations.

A cell similarity function returns true if table cell(r,c) is similar to table cell(r',c') and returns false otherwise. Different similarity functions define alternative versions of similarities to achieve different goals. Some example cell similarity functions include, but are not limited to—

Data type similarity—Two cells are similar if they both contain text of the same data type, e.g., string, integer, real, date, and so on.

Numerical size similarity—Two cells are similar if they contain numbers that are similar in size. That is, two cells containing numbers are similar if the two numbers are within a multiple of O (e.g., some power of 10) of each other. For example, $$\frac{1}{O} \leq \left| \frac{\text{cell}(r, c)}{\text{cell}(r', c')} \right| \leq O$$

String content similarity—Two cells are similar if they contain the same font sizes, the same amount of indention, or same or similar string characteristics.

Composite similarity—Two cells are similar if they contain more than one similar characteristics, for example, when the cells include data with same font sizes, and similar numeric sizes (i.e., the cells have a combination of string content similarity and numerical size similarity).

These example similarities are described only as example methods of cell comparison. Using this disclosure, those of ordinary skill in the art will be able to determine many other types of similarities on which to base cell comparison, and the same are contemplated within the scope of the illustrative embodiments. The example embodiments are described using data type similarity ($S_{DT}$) only for the clarity of the description and without implying any limitation thereto. Other cell comparison methods are similarly applicable to the embodiments within the scope of the illustrative embodiments.

The illustrative embodiments are described with respect to certain documents and tabular data only as examples. Such documents, tabular data, or their example attributes are not intended to be limiting to the invention. Furthermore, documents that contain only tabular data, such as a document with one or more tables and no unstructured or non-tabular content, are also contemplated within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Figure 2:
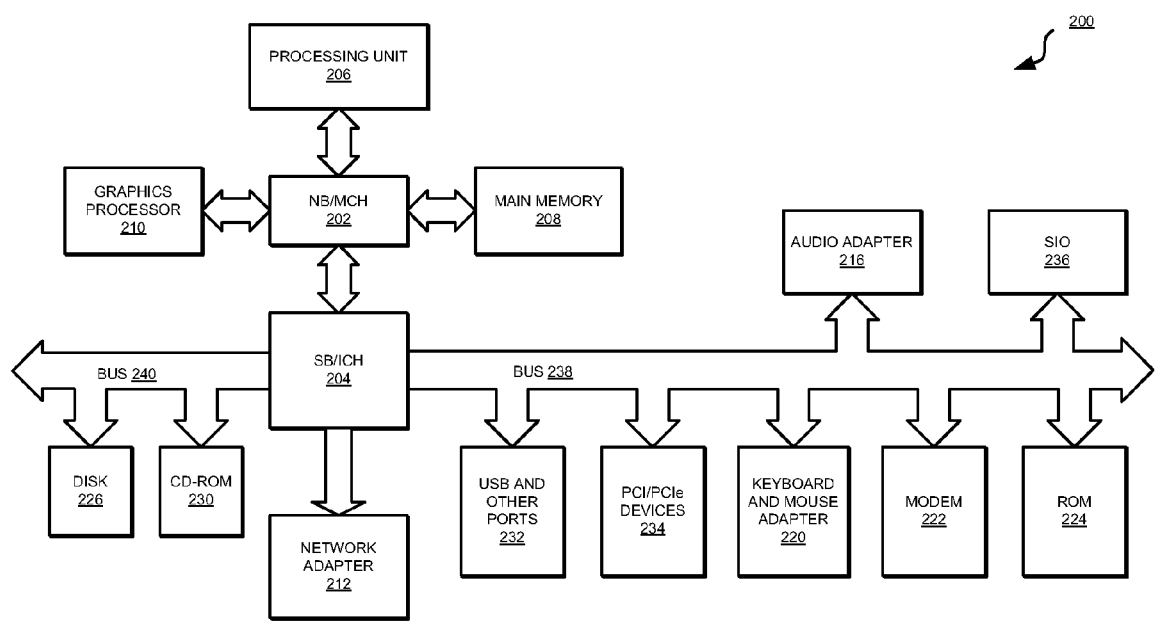
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a pictorial representation of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Server 104 and server 106 couple to network 102 along with storage unit 108. Software applications may execute on any computer in data processing environment 100.

In addition, clients 110, 112, and 114 couple to network 102. A data processing system, such as server 104 or 106, or client 110, 112, or 114 may contain data and may have software applications or software tools executing thereon.

Only as an example, and without implying any limitation to such architecture, FIG. 1 depicts certain components that are usable in an example implementation of an embodiment. For example, Application 105 in server 104 is an implementation of an embodiment described herein. Application 105 operates on tabular data included in document 109 of a corpus stored in storage 108. In one embodiment, application 105 operates in conjunction with NLP engine 107 to convert the tabular data into natural language sentences. NLP engine 107 may be, for example, an existing application capable of performing natural language processing on documents, and may be modified or configured to operate in conjunction with application 105 to perform an operation according to an embodiment described herein. In another embodiment, application 105 operates in conjunction with Q&A system 111. For example, application 105 constructs contextual text representation of tabular data from document 109, NLP engine 107 constructs natural language statements from that text, and Q&A system 111 uses those natural language statements as a part of a knowledgebase to answer questions.

Servers 104 and 106, storage unit 108, and clients 110, 112, and 114 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications.

With reference to FIG. 2, this figure depicts a block diagram of a data processing system in which illustrative embodiments may be implemented. Data processing system 200 is an example of a computer, such as server 104 or client 112 in FIG. 1, or another type of device in which computer usable program code or instructions implementing the processes may be located for the illustrative embodiments.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE) or serial advanced technology attachment (SATA) interface. A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive 226, CD-ROM 230, and other similarly usable devices are some examples of computer usable storage devices including computer usable storage medium.

An operating system runs on processing unit 206. The operating system coordinates and provides control of various components within data processing system 200 in FIG. 2. The operating system may be a commercially available operating system such as AIX® (AIX is a trademark of International Business Machines Corporation in the United States and other countries), Microsoft® Windows® (Microsoft and Windows are trademarks of Microsoft Corporation in the United States and other countries), or Linux® (Linux is a trademark of Linus Torvalds in the United States and other countries). An object oriented programming system, such as the Java™ programming system, may run in conjunction with the operating system and provides calls to the operating system from Java™ programs or applications executing on data processing system 200 (Java and all Java-based trademarks and logos are trademarks or registered trademarks of Oracle Corporation and/or its affiliates).

Instructions for the operating system, the object-oriented programming system, and applications, logic, or programs, such as application 105 and repositories and signatures 109 in FIG. 1, are located on at least one of one or more storage devices, such as hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a PDA.

With reference to FIG. 3, this figure depicts an example of tabular data within which structural relationships and similarities can be identified in accordance with an illustrative embodiment. Table 300 is an example of tabular data appearing in document 109 in FIG. 1, which can be modeled according to a table structure and cell similarities using application 105 in FIG. 1.

The horizontal or vertical rule-lines are depicted for bounding a table and cell only as an example without implying a limitation thereto. A table or tabular data can be expressed in any suitable manner, and a cell can be demarcated in any manner within the scope of the illustrative embodiments. For example, indentation, spacing between cell data, different spacing in tabular and non-tabular content, symbols, graphics, a specific view or perspective to illustrate tabular data, or a combination of these and other example manner of expressing tabular data and cells therein are contemplated within the scope of the illustrative embodiments.

Row 302 is a portion of table 300 that includes several headers that serve to organize the data in the various cells into headings, categories, or classifications (categories). The headers can be row-headers 304 or column headers 302. The headers are not limited to the table boundaries or extremities within the scope of the illustrative embodiments. For example, a header can be embedded within a table, between cells, such as in the form of a sub-header, for example, to identify a sub-category of tabular data. Such sub-row or sub-column headers are contemplated within the scope of the illustrative embodiments. In one embodiment, certain header information can be specified separately from the corresponding tabular data, such as in a footnote, appendix, another table, or another location in a given document.

The contents of table 300 satisfy certain cell similarities. For example, the data types of the row header cells, e.g., cells 306 and 308, are similar to each other—they are all years. The data types of the column header cells, e.g., cells 310 and 312, are similar to each other—they are all strings. Cells in area 314 are similar to each other—they are all real numbers.

Now consider row 316, which is a row footer of column averages. The contents of cells in area 318 satisfy a cell similarity with the cells in area 314 in that they are also all real numbers. Row header cell 320, however, is not similar to other row header cells such as cells 306 and 308. Where the data types of row header cells 306 and 308 is "year values", row header cell 320 is of type string data type. Thus, an embodiment recognizes that the structure of table 300 sans row 316 is different from the structure of table 300 with row 316.

Figure 4:
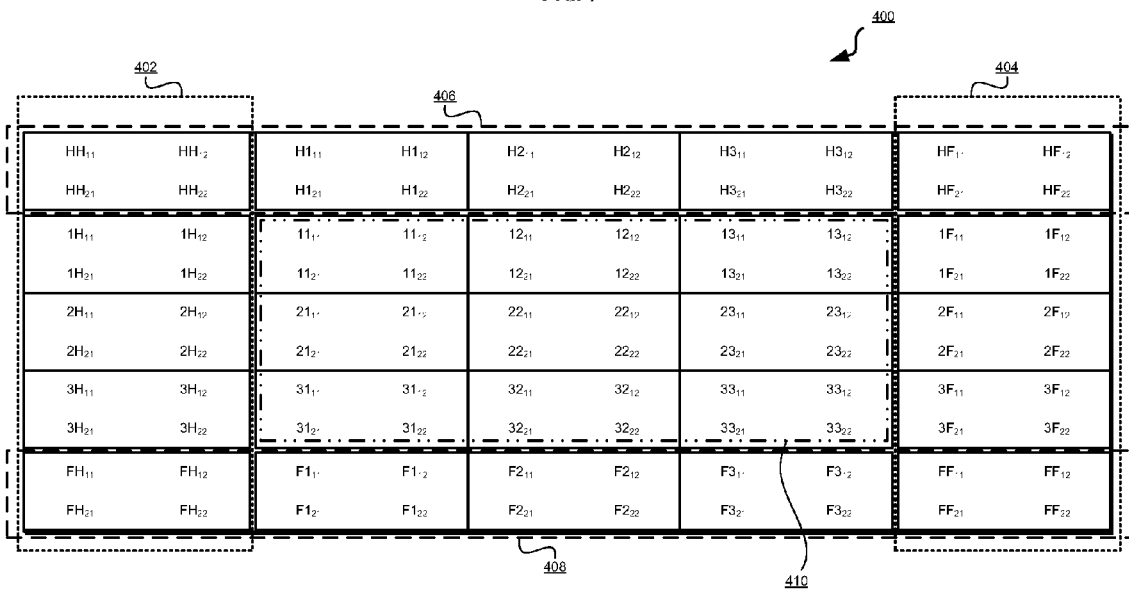
FIG. 4 depicts a generalized structure representation that is configurable to represent any table in accordance with an illustrative embodiment.

With reference to FIG. 4, this figure depicts a generalized structure representation that is configurable to represent any table in accordance with an illustrative embodiment. For example, structure 400 is configurable to represent table 300 in FIG. 3.

The content of each cell is denoted as $RC_{ij}$ where R is a row designation character (row identifier) and C is a column designation character (column identifier). For example, "H" represents for a row header cell or a column header cell, depending on whether "H" appears in a cell's notation in the first position or second position, respectively. A numeral (1, 2, . . . , n) denotes a supercell's row number or column number, depending on whether the numeral appears in a cell's notation in the first position or second position, respectively. "F" represents for a row footer cell or a column footer cell, depending on whether "F" appears in a cell's notation in the first position or second position, respectively.

A supercell is a group of cells in a given table that are related to each other. The cells in a supercell are related to each other such that the contents of the related cells have to be interpreted together to understand the meaning of the content of any of those related cells. A supercell ($RC_{ij}$) is also implicitly related to a corresponding column header cell ($HC_{ij}$), its column footer cell (RFij), its row header cell ($RH_{ij}$), and its row footer cell ($RF_{ij}$).

For example, recall the example balance sheet table described earlier. There, the cell that described the nature of the asset and the adjacent cell that contains the asset's value together form a supercell. Similarly, the cell that described the nature of a liability and the adjacent cell that contains the liability's value together form another supercell. There, each supercell is 1×2 matrix owing to the one-row two-column span of the supercell.

Similarly, a supercell can span any number of cells in any number of rows and columns. For example, a supercell can be a 2×2 matrix, a 2×3 matrix, a 7×5 matrix, and generally an n×m matrix. Example structure 400 is described using a 2×2 supercell only for the clarity of the description and without implying any limitation thereto on the illustrative embodiments.

The ij subscripts of RC in each element of each supercell are row and column numbers, respectively, within the supercell. Accordingly, structure 400 is an example table structure having multiple row headers 402, each of size two rows by two columns, and multiple row footers 404, each of size two rows by two columns, multiple column headers 406 of size two rows by two columns, and multiple column footers 408 of size two rows by two columns. The table also contains nine supercells of size two rows by two columns in area 410.

Let $T_{rh,rf,ch,cf,sr,sc}$ be the table structure function with rh row headers, rf row footers, ch column headers, cf column footers, and supercells of size sr by sc. Structure 400 satisfies table structure $T_{2,2,2,2,2,2}$.

Given a table structure T, two cells (r, c) and (r',c') in the same table should be similar, i.e., T(r,c,r',c'), whenever—

The two cells are both row headers, i.e., ((r, c)=$nH_{ij}$, (r',c')=$n'H_{i'j'}$, and i=i', and j=j'); or The two cells are both row footers, i.e., ((r, c)=$nF_{ij}$, (r',c')=$n'F_{i'j'}$, and i=i', and j=j'); or The two cells are both column headers, i.e., ((r, c)=$Hm_{ij}$, (r',c')=$Hm'_{i'j'}$, and i=i', and j=j'); or The two cells are both column footers, i.e., ((r, c)=$Fm_{ij}$, (r',c')=$Fm'_{i'j'}$, and i=i', and j=j'); or The two cells are in different supercell, i.e., ((r, c)=$nm_{ij}$, (r',c')=$n'm'_{i'j'}$, and i=i', and j=j')

Otherwise, the two cells are from different regions, and the cells are not required to be similar. Cell (r, c) should be similar to itself. Cells in the four corners ($HH_{ij}$, $HF_{ij}$, $FH_{ij}$, $FF_{ij}$,) are not compared to any other cells.

Now, combining the cell similarity function and a table structure function, two cells satisfy a table structure whenever D(r,c,r',c')=IF T(r,c,r',c'), THEN S(r,c,r',c'), ELSE 1

In simplistic terms of Boolean outcomes, data observation D(r,c,r',c') is true whenever a table structure suggests that two cells should be similar, and a similarity function validates the assertion that the two cells are in fact similar, using a given cell similarity function. Otherwise, the data observation D(r,c,r',c') is false. In probabilistic terms, as will become clearer elsewhere in this disclosure, the probability of D(r,c,r',c') being true is the same as the probability that S(r,c,r',c') is true if T (r,c,r',c') is true, otherwise false.

Stated another way, when a table structure suggests that two cells should be similar, the two cells are similar only with a probability. The probability exceeds a threshold value and approaches 1 when the assertion is more likely to be true than false, and the probability is at or below the threshold value and approaches 0 when the assertion is equally likely or more likely to be false than true.

Model M is a function of the selected table structure and the selected cell similarity function, and is represented as M=(T,S). The probability that a particular model fits given tabular data is therefore a probability value derived from whether that S validates the cell similarity assertions made in that T overall for the given tabular data. Different models $M_1$, $M_2$, . . . , $M_n$ are different combinations of table structures and cell similarity functions. Consequently, different models fit the same table with different probabilities. The probability that a particular model fits the given tabular data exceeds a threshold value and approaches 1 when the assertion is right for more cells than wrong, and the probability is at or below the threshold value and approaches 0 when the assertion is wrong for same or more cells than right in that tabular data.

Figure 5:
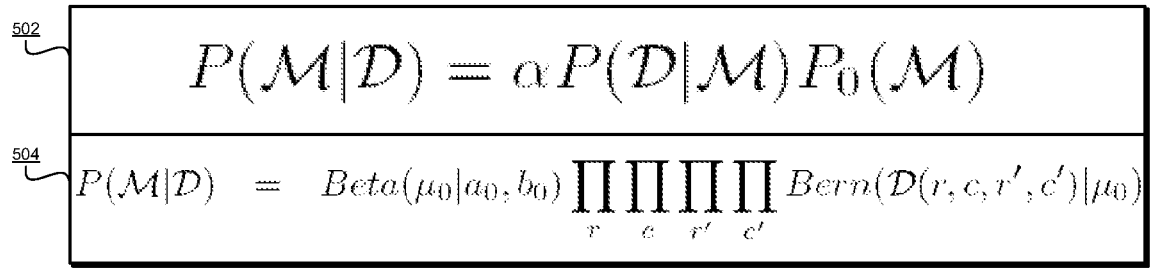
FIG. 5 depicts equations to compute the probability of a model fitting a given tabular data in accordance with an illustrative embodiment.

With reference to FIG. 5, this figure depicts equations to compute the probability of a model fitting a given tabular data in accordance with an illustrative embodiment. The depicted equations are examples, and are not intended to be limiting on the illustrative embodiments. Application 105 implements these equations, variations thereof, or other similarly purposed equations within the scope of the illustrative embodiments.

P(b|a) represents conditional probability of "b", given "a". Given a model M=(T,S), and a data set D (i.e., the given tabular data), Bayes' rule provides equation 502, to wit, $$P(M|D) = \alpha P(D|M) P_0(M)$$

Where P(M|D) represents the probability that M is the correct model given tabular data D; P(D|M) is the probability that the totality of cells in data D will be similar given a particular table structure according to model M; $P_0$ is a prior probability of model M.

One example embodiment uses a Bernoulli distribution for the likelihood P(D|M), which is the probability of cells being similar, and a Beta distribution for the prior probability $P_0(M)$.

The Bernoulli distribution of a random variable x that can take on the values x=1 (with probability μ) or x=0 (with probability 1−μ) is $$\text{Bern}(x|\mu) \equiv \mu^x (1-\mu)^{1-x}$$

The Beta distribution of a random variable x that can take on the values x=0 or x=1 is $$\text{Beta}(\mu \mid a, b) \equiv \frac{\Gamma(a+b)}{\Gamma(a)\Gamma(b)} \mu^{a-1} (1-\mu)^{b-1}$$

Where Γ(x) is the Gamma function.

An embodiment recognizes that the Beta function is conjugate to the Bernoulli function, which means a Bernoulli distribution times a Beta distribution results in a Beta distribution. Therefore, the resulting posterior probability P(M|D) is also a Beta distribution.

$$Beta(\mu|a+1,b)=Bern(x=1|\mu)*Beta(\mu|a,b)$$

$$Beta(\mu|a,b+1)=Bern(x=0|\mu)*Beta(\mu|a,b)$$

While not necessarily true in all case, in an embodiment that use Bernoulli and Beta functions, the threshold value ($\mu$) can be used to determine whether x is "probably true" or "probably false". Given a model M with a Bernoulli distribution and prior probability Beta($\mu_0|a_0,b_0$), the probability of that model M, given data D, is equation 504, to wit, $$P(\mathcal{M}|\mathcal{D}) = Beta(\mu_0|a_0, b_0) \prod_r \prod_c \prod_{r'} \prod_{c'} Bern(\mathcal{D}(r, c, r', c')|\mu_0)$$

The probability threshold is used with Bernoulli and Beta functions only as an example and not to imply a limitation on the illustrative embodiments. For example, an embodiment can be configured to use Bayesian networks without one or more probability thresholds. Those skilled in the art will realize other mathematical functions or representations can be used for P(M|D) and the prior $P_0$ and the same are contemplated within the scope of the illustrative embodiments.

With reference to FIG. 6, this figure depicts a manner of determining a best fit between the models considered and the given tabular data in accordance with an illustrative embodiment. Table 600 is generated by application 105 using the computations described with respect to FIGS. 4 and 5.

An embodiment implemented in application 105 evaluates multiple candidate models, $M_i=(T_i,S)$, each with a different $T_i$ but with the same S function. The embodiment evaluates these multiple models using data observations D(r,c,r',c'). The embodiment computes the probability of fit between each model and the given data using equation 504 in FIG. 5.

Table 600 is an example representation of the result of such computations. Column 602 indicates that model $M_1$ is the best fit for data in table $T_1$, column 604 indicates that model $M_2$ is the best fit for data in table $T_2$, and column 606 indicates that model $M_x$ is the best fit for data in table T. In other words, from a collection of models $M_{1 \ldots x}$ that were evaluated for the various tables identified in a given corpus, table $T_1$ has the highest probability of being described by model $M_1$, table $T_2$ has the highest probability of being described by model $M_2$, and table $T_n$ has the highest probability of being described by model $M_x$.

One embodiment selects the best fit model for a given table simply by finding the model that achieved the highest probability amongst all models tested for that table. This embodiment always results in a selection no matter how low the highest probability achieved by any model for that table.

Another embodiment selects the best fit model for a given table by first short-listing those models that achieved greater than a threshold probability. The embodiment then selects that model from the short-listed models, which achieved the highest probability amongst all the short-listed models. This embodiment may not always results in a selection, such as when the highest probability achieved by any model amongst all models tested for the table fails to exceed the threshold.

For example, assume that a threshold probability of picking a fitting model is sixty percent, or better than 0.6 probability. Further assume that example model $M_1$ has a probability 0.2, $M_2$ has a probability 0.7, $M_3$ has a probability 0.65, This embodiment discards model $M_1$ from consideration and selects $M_3$ from the short-list of $M_2$ and $M_3$. Now assume that example model $M_1$ has a probability 0.2, $M_2$ has a probability 0.25, $M_3$ has a probability 0.28, This embodiment does not select any model because none of the models has a probability that exceeds the threshold probability and the short-list is empty. In contrast, the embodiment without a threshold probability would select $M_3$ because $M_3$ has the highest probability amongst $M_1$, $M_2$, and $M_3$.

Computing the probabilities of each cell-pair being similar to one another for each model to be considered can be computationally expensive. An embodiment approximates the probability of a model-fit by evaluating the probability on a random sample of data observations D(r,c,r',c'). An embodiment achieves the desired level of accuracy in the probabilistic prediction of the model, while achieving acceptable computing resource expense, by randomly selecting a subset of all cell-pairs (r,c) and (r',c'), and evaluating the probability using just the sample cell-pairs as follows, $$P(\mathcal{M}|\mathcal{D}) = Beta(\mu_0|a_0, b_0) \prod_{(r,c,r',c') \in sample} Bern(\mathcal{D}(r, c, r', c')|\mu_0)$$

One embodiment begins evaluating the probability using a predetermined minimum number of samples, $N_{min}$, and continues sampling as long as the model's probability remains below some threshold probability. As an upper bound on the computations, another embodiment stops further sampling and computations when some maximum number of samples $N_{max}$ have been evaluated. An embodiment selects the table structure $M_i$ that achieves the highest probability within the sampling in the manner described with respect to FIG. 6.

Figure 7:
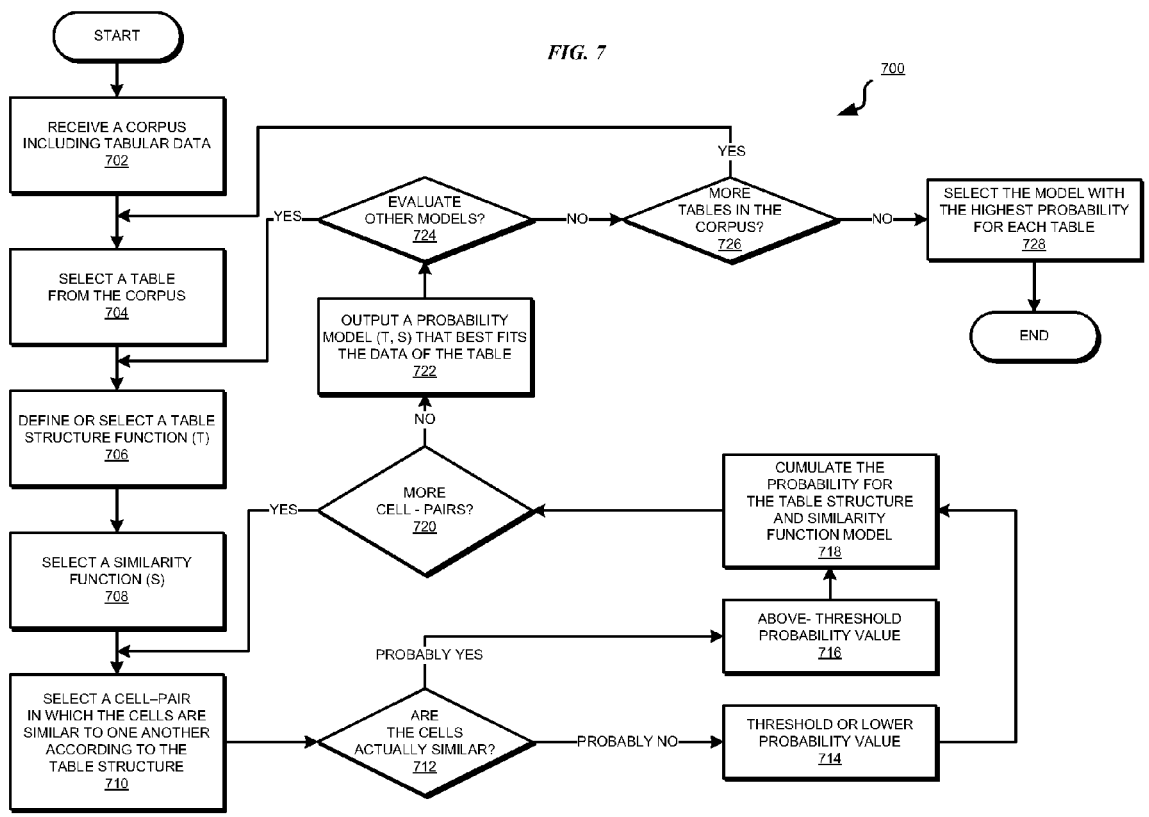
FIG. 7 depicts a flowchart of an example process of selecting a model to represent tabular information in accordance with an illustrative embodiment.

With reference to FIG. 7, this figure depicts a flowchart of an example process of selecting a model to represent tabular information in accordance with an illustrative embodiment. Process 700 can be implemented in application 105 in FIG. 1.

The application receives a corpus including at least one tabular data (block 702). The application selects a table from the corpus (block 704). The application defines a table structure T (block 706). In one embodiment, a collection of pre-defined table structures is available, such as in a repository, and the application selects a pre-defined table structure from the collection instead of defining a new table structure in block 706.

The application selects a cell similarity function S (block 708). The application selects a cell-pair in which the cells should be similar to one another according to the selected table structure (block 710). The application determines whether the cells in the selected cell-pair are actually similar to one another according to the selected cell similarity function S (block 712). If the cells are similar to each other with a threshold or less than threshold probability ("Probably No" path of block 712), the application records the threshold ($\mu$) or below-threshold ($<\mu$) value of the probability, as the case may be, for the cell-pair (block 714).

If the cells are similar to each other with a greater than threshold ($>\mu$) probability ("Probably Yes" path of block 712), the application records the above-threshold value of the probability for the cell-pair (block 716). The application cumulates the probability from block 714 or 716 to a probability for the selected table structure and similarity function model M (block 718). For example, the probability of block 714 or 716 decreases or increases, respectively, the overall probability of the model, such by decreasing or increasing a previously computed average probability of the model.

The application determines whether more cell-pairs have to be evaluated in a similar manner (block 720). If more cell-pairs, whether from a sampling or from the entirety of the selected table, are to be evaluated ("Yes" path of block 720), the application returns process 700 to block 710. If no more cell-pairs are to be evaluated ("No" path of block 720), the application outputs a probability that model M=(T,S) fits the selected table (block 722).

The application determines whether more models are to be evaluated for the selected table (block 724). If more models are to be tested ("Yes" path of block 724), the application returns process 700 to block 706 to define or select another table structure function T. If no more models are to be evaluated for the selected table, the application determines whether more tables exist in the corpus that have to be modeled in this manner (block 726). If so ("Yes" path of block 726), the application returns process 700 to block 704 to select another table. If not ("No" path of block 726), the application selects for each table, that respective model which achieves the highest probability for that table (block 728). The application ends process 700 thereafter.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Thus, a computer implemented method is provided in the illustrative embodiments for selecting a structure to represent tabular information. An embodiment discovers a structure that is suitable for representing the data presented in tabular form in a document. Using the structure, an embodiment can be further configured to output statements or text describing the contents of various table cells in their appropriate context. Another application, such as an NLP engine, can be configured to accept the generated statements and convert the statements in a suitable natural language form. Another application, such as a Q&A system, can accept the statements generated by an embodiment, the natural language form of the statements, or a combination thereof, to answer questions pertaining to the subject-matter domain of the corpus.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable storage device(s) or computer readable media having computer readable program code embodied thereon.

Any combination of one or more computer readable storage device(s) or computer readable media may be utilized. The computer readable medium may be a computer readable signal medium or a computer readable storage medium. A computer readable storage device may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage device would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage device may be any tangible device or medium that can contain, or store a program for use by or in connection with an instruction execution system, apparatus, or device.

Program code embodied on a computer readable storage device or computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to one or more processors of one or more general purpose computers, special purpose computers, or other programmable data processing apparatuses to produce a machine, such that the instructions, which execute via the one or more processors of the computers or other programmable data processing apparatuses, create means for implementing the functions/acts specified in the flowchart and/or block diagram block or blocks.

These computer program instructions may also be stored in one or more computer readable storage devices or computer readable media that can direct one or more computers, one or more other programmable data processing apparatuses, or one or more other devices to function in a particular manner, such that the instructions stored in the one or more computer readable storage devices or computer readable medium produce an article of manufacture including instructions which implement the function/act specified in the flowchart and/or block diagram block or blocks.

The computer program instructions may also be loaded onto one or more computers, one or more other programmable data processing apparatuses, or one or more other devices to cause a series of operational steps to be performed on the one or more computers, one or more other programmable data processing apparatuses, or one or more other devices to produce a computer implemented process such that the instructions which execute on the one or more computers, one or more other programmable data processing apparatuses, or one or more other devices provide processes for implementing the functions/acts specified in the flowchart and/or block diagram block or blocks.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

What is claimed is:

1. A method for selecting a structure to represent tabular information, the method comprising:

selecting, corresponding to a table comprising the tabular information, a table structure from a collection of table structures, wherein the table structure is selected from the collection of table structures based upon a probability of the table structure representing the tabular information of the table;

selecting a table structure function, the table structure function describing when cells in a cell-pair in the table structure should be similar to one another;

selecting a cell similarity function, wherein the cell similarity function compares the cells in the cell-pair in the table structure and outputs a probability that the cell-pair includes cells that contain values that are similar to one another according to a criterion;

determining a cell similarity probability, the cell similarity probability being a probability value that, in a first cell-pair in the table, a first cell in the first cell-pair is actually similar to a second cell in the first cell-pair according to the cell similarity function;

adjusting a computed probability of the table structure representing the table using the cell similarity probability; and indicating the computed probability as a probability of a first model representing the table, wherein the first model is a function of the table structure and the selected cell similarity function;

selecting, corresponding to the table, a second table structure;

selecting a second cell-pair from the second table structure;

determining a cell similarity probability of a first cell and a second cell in the second cell-pair are similar to each other according to the cell similarity function;

adjusting a second computed probability of the second table structure representing the table using the cell similarity probability;

indicating the second computed probability as a probability of a second model representing the table, wherein the second model is a function of the second table structure and the selected cell similarity function;

selecting, from a set of models, that model which has a higher computed probability, forming a selected model, the set of models comprising the first model and the second model;

forming an interpretation of the table according to the selected model, wherein the Q&A system uses the interpretation to answer the natural language question; and indicating a third computed probability as a probability of a third model representing the table, wherein the third model is a function of a third table structure and the selected cell similarity function, wherein the selecting selects from a subset of the set of models, wherein the subset comprises those models whose corresponding computed probabilities exceed a probability threshold.

2. The method of claim 1, wherein the adjusting comprises:

using the cell similarity probability in computing an average cell similarity possibility of the table structure over several cell-pairs.

3. The method of claim 1, wherein the selecting the first cell-pair, the determining the cell similarity probability and the adjusting are performed for a subset of a set of all cell-pairs present in the table structure.

4. The method of claim 1, wherein the criteria in the cell similarity function requires a type of the values in the cells of the given cell-pair to match.

5. The method of claim 1, wherein the criteria in the cell similarity function requires the values in the cells of the given cell-pair to be within a range of each other.

6. The method of claim 1, wherein the defining further comprises:

identifying a supercell in the table, wherein the supercell comprises a set of adjacent cells, wherein a content of a first cell in the set of adjacent cells describes a content of a second cell in the set of adjacent cells.

7. The method of claim 6, wherein the first cell-pair comprises a first supercell and a second supercell.

8. The method of claim 1, further comprising:

identifying a set of row header cells in the table; and identifying a set of column header cells in the table.

9. The method of claim 8, wherein the first cell-pair comprises a first row header cell and a second row header cell in the table.

10. The method of claim 8, wherein the first cell-pair comprises a first column header cell and a second column header cell in the table.

11. The method of claim 1, wherein the table comprises row and column coordinates and includes the tabular data, wherein at least one cell in the table cannot be identified by the row and column coordinates of the table, and wherein the at least one cell is related to at least one other cell in the table such that a value in the at least one cell provides a contextual information for interpreting a value in the at least one other cell.

12. The method of claim 1, wherein the table is included in a document with a second table including second tabular data, further comprising:

defining a second table structure corresponding to the second table;

selecting a second cell similarity function;

indicating a second computed probability as a probability of a second model representing the second table, wherein the second model is a function of the second table structure and the second cell similarity function; and forming a second interpretation of the second table according to the second model, wherein the Q&A system further uses the second interpretation to answer the natural language question.

13. The method of claim 1, further comprising:

determining whether the collection of table structures includes a suitable table structure applicable to the table, wherein the selecting is collection of table structures includes a suitable table structure, and wherein the table structure is the suitable table structure; and defining the table structure, the defining being responsive to determining that the collection of table structures does not include the suitable table structure.

* * * * *